United States Patent
Guo et al.

(10) Patent No.: US 9,641,459 B2
(45) Date of Patent: May 2, 2017

(54) USER-DEFINED FLEXIBLE TRAFFIC MONITORING IN AN SDN SWITCH

(71) Applicant: ALCATEL-LUCENT USA, INC., Murray Hill, NJ (US)

(72) Inventors: Yang Guo, Princeton Jct., NJ (US); Fang Hao, Morganville, NJ (US); Tirunellai V. Lakshman, Morganville, NJ (US); An Wang, Fairfax, VA (US)

(73) Assignee: Alcatel Lucent, Boulogne-Billancourt (FR)

( * ) Notice: Subject to any disclaimer, the term of this patent is extended or adjusted under 35 U.S.C. 154(b) by 152 days.

(21) Appl. No.: 14/695,710

(22) Filed: Apr. 24, 2015

(65) Prior Publication Data
US 2016/0315880 A1    Oct. 27, 2016

(51) Int. Cl.
*G01R 31/08*  (2006.01)
*H04L 12/54*  (2013.01)
*H04L 12/935* (2013.01)
*H04L 12/801* (2013.01)
*H04L 12/861* (2013.01)
*H04L 12/721* (2013.01)
*H04L 12/26*  (2006.01)
(Continued)

(52) U.S. Cl.
CPC .......... *H04L 49/3009* (2013.01); *H04L 43/04* (2013.01); *H04L 45/70* (2013.01); *H04L 47/10* (2013.01); *H04L 47/2441* (2013.01); *H04L 49/90* (2013.01); *H04L 45/64* (2013.01)

(58) Field of Classification Search
USPC ....... 370/392, 389, 250, 409, 235, 236, 254, 370/412, 428, 216, 225, 237, 241, 252, 370/253, 255, 328, 355, 390, 400, 422
See application file for complete search history.

(56) References Cited

U.S. PATENT DOCUMENTS

2012/0246400 A1 * 9/2012 Bhadra ............... H04L 49/3009
                                                                711/104
2013/0176888 A1    7/2013 Kubota et al.
(Continued)

OTHER PUBLICATIONS

International Search Report and Written Opinion dated Jul. 12, 2016 for International Application No. PCT/US2016/028210.
(Continued)

*Primary Examiner* — Phuongchau Ba Nguyen
(74) *Attorney, Agent, or Firm* — Kramer & Amado, P.C.

(57) ABSTRACT

Various embodiments relate to a method, network node, and non-transitory machine-readable storage medium including the following: receiving a packet; evaluating a flow processing table comprising a plurality of rules to determine whether a rule of the plurality of rules is applicable to the received packet, wherein: a rule of the plurality of rules includes a matching rule that identifies one or more flows to which the rule applies and at least one action that identifies at least one action to be taken when the rule applies; generating a new rule to be added to the flow processing table when the after failing to identify a rule of the plurality of rules as applicable to a received packet, including: evaluating at least one flow rule generation table to identify a first set of packet header fields and a set of processing actions; installing the new rule in the flow processing table.

20 Claims, 7 Drawing Sheets

(51) Int. Cl.
*H04L 12/851* (2013.01)
*H04L 12/715* (2013.01)

(56) References Cited

U.S. PATENT DOCUMENTS

2015/0244599 A1* 8/2015 Nagai ................ G06F 11/0727
709/223
2015/0304216 A1* 10/2015 Suzuki .................... H04L 45/16
370/390

OTHER PUBLICATIONS

Open Flow Switch Specification Version 1.5.0, https://www.opennetworking.org/images/stories/downloads/sdn-resources/onf-specifications/openflow/openflow-switch-v1.5.0.noipr.pdf, Dec. 19, 2014.
Bianchi, et al., Public Review for OpenState: Programming Platform-independent Stateful OpenFlow Applications Inside the Switch; ACM SIGCOMM Computer Communication Review, New York, NY, vol. 44, No. 2, Apr. 2014, pp. 44-51.
Wang, et al., UMON: Flexible and Fine Grained Traffic Monitoring in Open vSwitch, CoNEXT 15, Dec. 1-4, 2015, Heidelberg, Germany, 7 pgs.
Cisco IOS NetFlow, http://www.cisco.com/c/en/us/products/ios-nx-os-software/ios-netflow/index.html, Apr. 3, 2015.
Defcon CTF Archive, https://www.defcon.org/html/links/dc-ctf.html., Apr. 24, 2015.
Open vSwitch, http://openswitch.org/., Apr. 24, 2015.
OpenFlow Switch Specification, The Open Networking Foundation, Oct. 14, 2013.
"sFlow", http://www.sflow.org/., Apr. 24, 2015.
Bosshart, et al., "P4: Programming Protocol-Independent Packet Processors",SIGCOM Computer Communication Rev., 44(3) Jul. 2014.
Fontugne, et al., "MAWILAB: Combining Diverse Anomaly Detectors for Automated Anomaly Labeling and Performance Benchmarking", Proceedings of the 6th International Conference, p. 8. ACM, 2010.
Khan, et al., "Streaming Solutions for Fine-Grained Network Traffic Measurements and Analysis" ANCS, 2011.
Moshref, et al., "DREAM: Dynamic Resource Allocation for SOftware-Defined Measurement", ACM SIGCOMM, Aug. 17-22, 2014.
Wiles, "Pktgen-DPDK", http://github.com/Pktgen/Pktgen-DPDK/ Apr. 24, 2015.
Zhang, "An Adaptive Flow Counting Method for Anomaly Detection in SDN", CoNext'13, Dec. 2013.

* cited by examiner

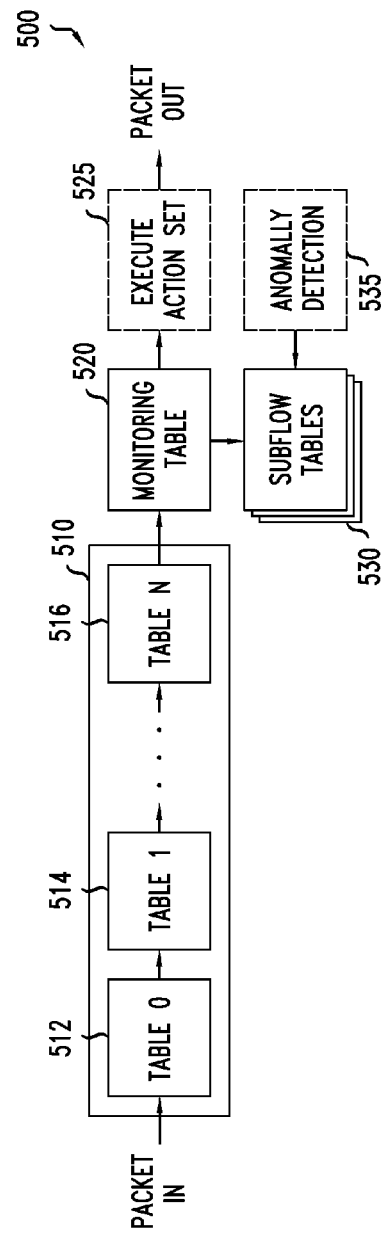

| | MATCHING RULE | ACTIONS | COUNTERS | POINTER |
|---|---|---|---|---|
| | ⌐ 605 | ⌐ 610 | ⌐ 615 | ⌐ 620 |
| 630 | SRCIP=D; SRCPORT=*; DESTIP=*; DESTPORT=* | MONITOR SYN | PACKETS=410; BYTES=505K; SYN PACKETS=20 | – |
| 640 | SRCIP=*; SRCPORT=*; DESTIP=*; DESTPORT=G | MICROFLOW MONITORING | – | 0x4521 |
| 650 | SRCIP=*; SRCPORT=*; DESTIP=*; DESTPORT=H | SUBFLOW MONITORING {1010} | – | 0x45AD |
| | ... | ... | ... | ... |

| | | |
|---|---|---|
| 712 | SRCIP=D; SRCPORT=F; DESTIP=E; DESTPORT=G | PACKETS=20; BYTES=24K |
| 714 | SRCIP=J; SRCPORT=K; DESTIP=E; DESTPORT=G | PACKETS=522; BYTES=627K |
| 716 | SRCIP=E; SRCPORT=F; DESTIP=M; DESTPORT=G | PACKETS=12; BYTES=115K |
| | ... | ... |

# USER-DEFINED FLEXIBLE TRAFFIC MONITORING IN AN SDN SWITCH

TECHNICAL FIELD

Various exemplary embodiments disclosed herein relate generally to network switching and, more specifically but not exclusively, to configuration of software-defined networking (SDN) switches to perform monitoring of traffic flows therethrough.

BACKGROUND

As server virtualization becomes more widespread, network operators have begun turning to the software-defined networking (SDN) approach to address the unique challenges that come along with virtualization such as greatly increased network complexity, the increased capacity to scale upwards, and the desire to ensure consistent policy enforcement across a wide geographical area. According to SDN principles, the control plane and data plane seen in traditional networking equipment are decoupled. A centralized controller performs the control operations and configures multiple SDN switches to perform data forwarding functions through a communications protocol such as OpenFlow.

According to some implementations, through the SDN controller's configuration, SDN switches store flow processing tables that indicate, for packets belonging to a defined flow, what actions should be taken such as dropping, modifying, or forwarding the packet. SDN switches may also perform some monitoring of traffic flows such as, for example, counting a total number of bytes and packets forwarded for each defined flow. These values are typically also stored in the switch's flow processing table as part of the rule for the associated flow.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a non-transitory machine-readable storage medium encoded with instructions for execution by a network device, the non-transitory machine-readable storage medium including: instructions for processing packets based on a flow processing table, wherein: the flow processing table includes a plurality of rules, and a rule of the plurality of rules includes a matching rule that identifies one or more flows to which the rule applies and at least one action that identifies at least one action to be taken when the rule applies; and instructions for generating a new rule to be added to the flow processing table when the instructions for processing packets fails to identify a rule of the plurality of rules as applicable to a received packet, including: instructions for evaluating at least one flow rule generation table to identify a first set of packet header fields and a set of processing actions; instructions for evaluating a monitoring table to identify at least one of a second set of packet header fields and a set of monitoring actions, wherein the monitoring table includes a plurality of entries identifying monitoring actions to be taken for various groups of flows; instructions for generating a new rule based on the first set of packet header fields, the set of processing actions, and at least one of the second set of packet header fields and the set of monitoring actions; and instructions for installing the new rule in the flow processing table.

Various embodiments described herein relate to a network device including: a network interface; a memory storing: a flow processing table including a plurality of rules, wherein a rule of the plurality of rules includes a matching rule that identifies one or more flows to which the rule applies and at least one action that identifies at least one action to be taken when the rule applies, at least one flow rule generation table, and a monitoring table including a plurality of entries identifying monitoring actions to be taken for various groups of flows; and a processor in communication with the memory and the network interface, the processor being configured to: process packets received via the network interface based on the flow processing table, generate a new rule to be added to the flow processing table when, in processing packets, the processor fails to identify a rule of the plurality of rules as applicable to a received packet, including: evaluate the least one flow rule generation table to identify a first set of packet header fields and a set of processing actions; evaluate the monitoring table to identify at least one of a second set of packet header fields and a set of monitoring actions, wherein the monitoring table includes a plurality of entries identifying monitoring actions to be taken for various groups of flows; generate a new rule based on the first set of packet header fields, the set of processing actions, and at least one of the second set of packet header fields and the set of monitoring actions; and install the new rule in the flow processing table.

Various embodiments described herein relate to a method performed by a network device, the method including: receiving a packet belonging to a flow; attempting to process the packet based on a flow processing table, wherein: the flow processing table includes a plurality of rules, and a rule of the plurality of rules includes a matching rule that identifies one or more flows to which the rule applies and at least one action that identifies at least one action to be taken when the rule applies; generating a new rule to be added to the flow processing table after failing to identify a rule of the plurality of rules as applicable to a received packet, including: evaluating at least one flow rule generation table to identify a first set of packet header fields and a set of processing actions; evaluating a monitoring table to identify at least one of a second set of packet header fields and a set of monitoring actions, wherein the monitoring table includes a plurality of entries identifying monitoring actions to be taken for various groups of flows; generating a new rule based on the first set of packet header fields, the set of processing actions, and at least one of the second set of packet header fields and the set of monitoring actions; and installing the new rule in the flow processing table.

Various embodiments are described wherein the step of evaluating a monitoring table to identify at least one of a second set of packet header fields and a set of monitoring actions includes: retrieving the second set of packet header fields from an entry identified as applicable to the received packet, wherein the second set of packet header fields is different from a set of packet header fields used to identify the entry as applicable.

Various embodiments are described wherein the step of retrieving the second set of packet header fields from an entry identified as applicable to the received packet includes:

storing an identification of the flow to which the received packet belongs in a subflow table identified by the applicable entry.

Various embodiments additionally include periodically retrieving monitored statistics for a plurality of flows from the flow processing table, including: identifying a plurality of subflows using the subflow table; and retrieving monitored statistics for the plurality of subflows.

Various embodiments are described wherein the step of evaluating a monitoring table to identify at least one of a second set of packet header fields and a set of monitoring actions includes: based on an entry identified as applicable to the received packet, including in the set of monitoring actions a field monitoring action indicating that monitoring will be performed with respect to packets of an identified type, wherein the new rule includes a data structure for storing a counter for packets of the identified type.

Various embodiments are described wherein the step evaluating a monitoring table includes: identifying multiple entries from the monitoring table as applicable to the received packet; compiling the set of monitoring actions from the multiple applicable entries; and identifying the second set of packet header fields as a set of all fields considered by any entry in the monitoring table.

Various embodiments are described wherein the first set of packet header fields and the second set of packet header fields are first and second bitmasks, respectively, and the step of generating a new rule includes: combining the first and second bitmasks to create a combined bitmask; and computing a hash value from a plurality of packet header field values identified by the combined bitmask, wherein the hash value is used as a matching rule of the new rule.

BRIEF DESCRIPTION OF THE DRAWINGS

In order to better understand various exemplary embodiments, reference is made to the accompanying drawings, wherein:

FIG. 4 illustrates an exemplary flow processing table;

FIG. 5 illustrates an exemplary flow table pipeline;

FIG. 6 illustrates an exemplary monitoring table;

FIG. 7 illustrates an exemplary set of subflow tables;

To facilitate understanding, identical reference numerals have been used to designate elements having substantially the same or similar structure or substantially the same or similar function.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

As described above, SDN switches often perform limited flow monitoring and store these values in the associated processing rule. However, this approach presupposes that the network administrator is only interested in monitoring each unique flow from a routing standpoint. In other words, there is no ability to separately define a flow to be monitored apart from those flows that are defined as a consequence of the routing configurations. For example, a processing rule may be defined to forward any packet destined for address A to port 2. As a result of the above defined functionality, the SDN switch may collect a count of packets and bytes destined for A. However, a network administrator may be interested in additional information such as, for example, individual counts for each unique source contacting A, counts of packets within the flow having a specific type (e.g., SYN or ACK packets), or counts of packets coming from a specific source B regardless of whether the packets are destined for A. Existing implementations would not enable the collection of statistics for any of these examples. Accordingly, it would be desirable to provide a new SDN switch implementation that provides for enhanced traffic monitoring capabilities.

As will be explained in greater detail with respect to various examples below, various embodiments described herein enable such enhanced monitoring by providing a new "monitoring table" to be evaluated when creating rules for a rule processing table. The monitoring table defines the flows that are desired to be monitored and what monitoring actions should be taken for said flows. The matched monitoring table entries also add fields to the eventual new processing rule's matching rule to ensure the proper flow granularity.

Figure 1:
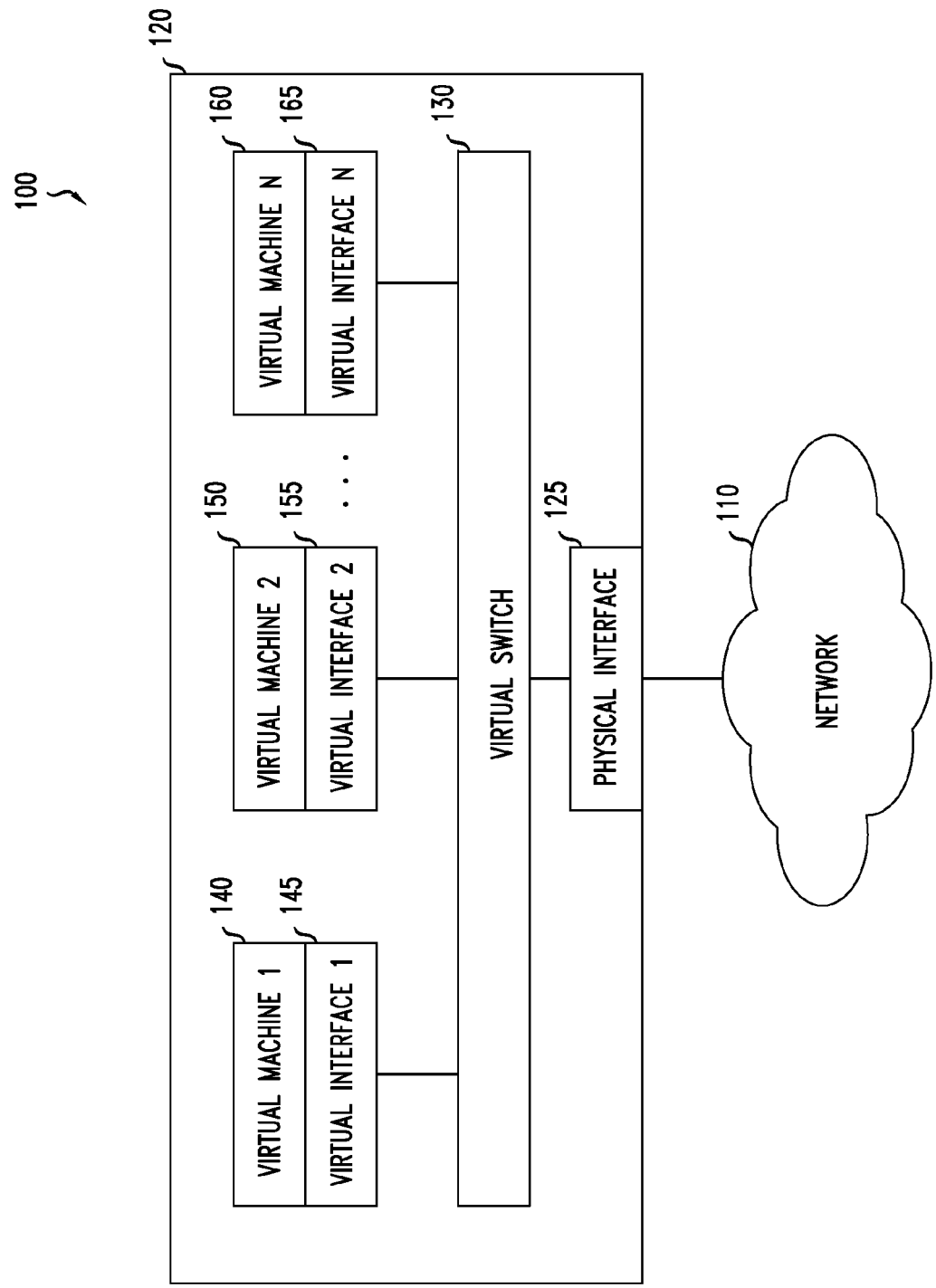
FIG. 1 illustrates an exemplary environment for an SDN switch.

FIG. 1 illustrates an exemplary environment 100 for an SDN switch. Specifically, the environment 100 shows the implementation of a virtual switch 130 (which operates according to the SDN paradigm and is, therefore, also an SDN switch) within a server 120 for exchanging packets between a network 110 (such as the Internet) and a plurality of virtual machines 140, 150, 160 also supported by the server 120. For example, the environment 100 may illustrate a segment of a cloud computing network where the server 120 is a hardware server located in a cloud datacenter.

The server 120 may be virtually any hardware capable of supporting virtual machines such as, for example, a blade, a desktop computer, or other computer device. As such, the server 120 may run various software not shown such as, for example, an operating system and a hypervisor. In some embodiments, the virtual switch 130 may be implemented as part of a hypervisor.

The server 120 includes a physical interface 125 for communicating with the network 110 according to one or more protocols. For example, the physical interface 125 may be a network interface card (NIC) and may implement Ethernet and TCP/IP stacks. It will be apparent that the server 120 may include additional physical interfaces.

Each of the virtual machines 140, 150, 160 implements a virtual interface 145, 155, 165, respectively that, to the virtual machine 140, 150, 160 appears to be a physical interface. The virtual interfaces 145, 155, 165 may also implement protocols such as an Ethernet and TCP/IP stacks. When an application or the OS of a virtual machine 140, 150, 160 transmits a packet to the respective virtual interface 145, 155, 165, the packet is passed to the virtual switch 130 to determine how the packet is to be forwarded (e.g., over the physical interface 125 or to another virtual interface 145, 155, 165). Likewise, upon receiving a packet from the physical interface 125, the virtual switch 130 identifies an appropriate virtual interface 145, 155, 165 (if any) to which the packet will be forwarded.

It will be appreciated that while various embodiments are described herein with respect to the example of FIG. 1, the techniques described herein may be used in other environments. For example, in some embodiments, the virtual switch 130 may be deployed in switch hardware such that the virtual switch exchanges packets between multiple physical ports rather than coresident virtual machines. In other embodiments, a switch may not use virtualized software but may nonetheless operate according to SDN principles and implement the methods described herein. Various modifications will be apparent to apply the concepts described herein to these other environments.

Figure 2:
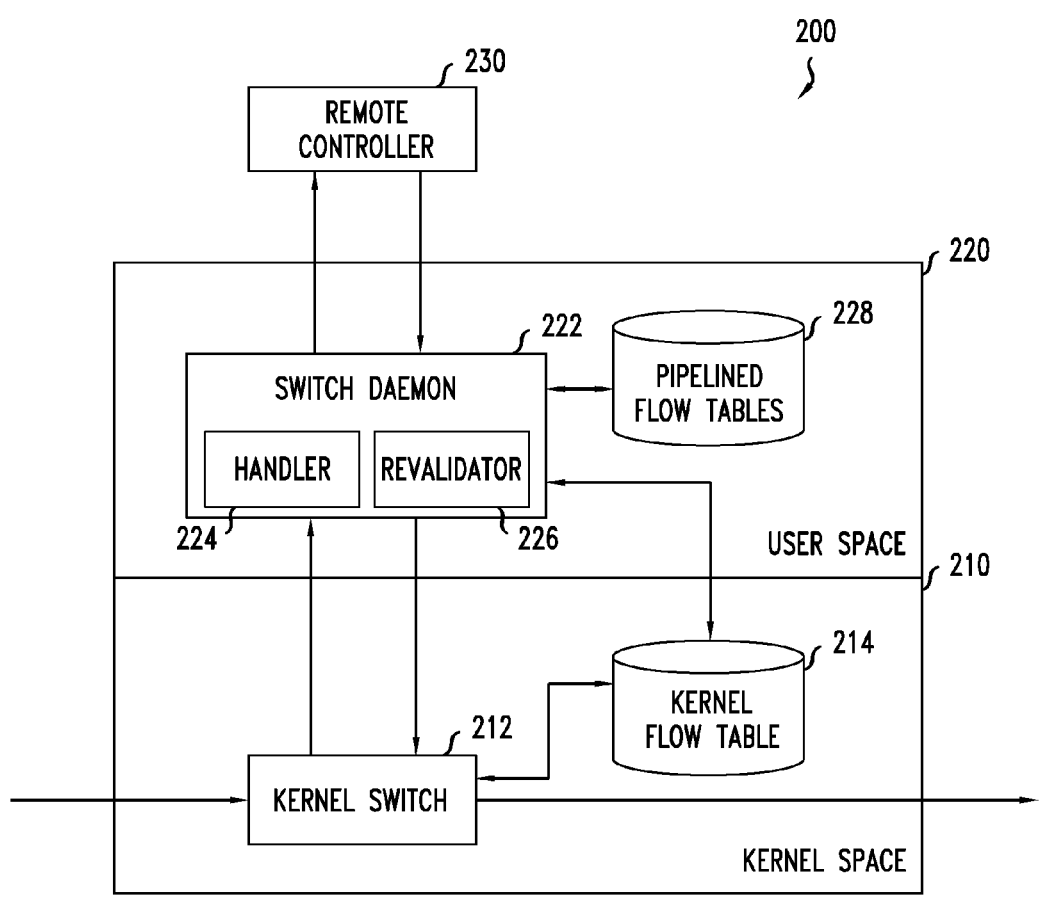
FIG. 2 illustrates an exemplary architecture for an SDN switch.

FIG. 2 illustrates an exemplary architecture 200 for an SDN switch. As shown, the virtual switch includes some components that operate in kernel space 210 and other components that operate in the user space 220 of the local memory. As will be understood, more streamlined operations and data structures may be assigned to kernel space to provide high-speed performance while slower and more process intensive operations that occur less frequently may be assigned to user space without having as much of an effect on performance. In some embodiments, the architecture 200 may correspond to an implementation of Open Vswitch extended according to the various concepts described herein.

Specifically, the architecture 200 shows that a kernel switch 212 that utilizes a kernel flow table 214 are located in kernel space 210. The kernel switch 212 may be a process that is situated in the data path of the packet flows through the virtual switch. As shown, incoming packets are received by the kernel switch 212, which then consults the kernel flow table 214 to determine which actions are to be performed such as, for example, dropping the packet, modifying one or more fields of the packet, or forwarding the packet onward over one or more ports. In this respect, the kernel flow table 214 is a type of "flow processing table" that stores a set of rules defining how incoming packets are to be handled on a per-flow basis. The kernel switch 212 and kernel flow table 214 are implemented to operate at relatively high speed (e.g., at line speed) and are intended to perform the entirety of processing on the majority of packets. When the kernel switch 212 is unable to determine how to treat a received packet based on the information currently stored in the kernel flow table 214, however, the kernel switch 212 passes the packet to a switch daemon 222 in user space to request an update to the kernel flow table 214. After such an update is performed, the switch daemon 222 passes the packet back to the kernel switch to be processed again now that the kernel flow table 214 has a rule that will match the packet. An example of a method for processing packets by the kernel module will be described in greater detail below with respect to FIG. 8.

The switch daemon 222 occupies user space and performs functions that are less frequent than the packet processing functions of the kernel switch 212. As shown, the switch daemon 222 includes two main threads: a handler 224 and a revalidator 226. The handler thread 224 is a process that takes action to update the kernel flow table 214 when the kernel switch 212 has failed to determine what action to take for processing a received packet. Upon receiving a packet from the kernel switch 212, the handler 224 consults a pipelined flow table 228 which is a more complete version of the switch's current flow routing configurations. Based on the evaluation of these tables, an example of which will be described in greater detail below with respect to FIG. 9, the handler 224 generates a new rule and installs the rule into the kernel flow table 214 such that the packet and other packets belonging to that flow may be processed by the kernel switch in the future. If application of the pipelined flow tables 228 does not result in generation of such a rule (e.g., in the case where the pipelined flow tables also contain insufficient information to determine how a packet is to be processed), the handler 224 passes the packet on to the remote SDN controller 230 to request the provision of additional configuration information for the pipelined flow tables which will subsequently be used to form a new rule for installation in the kernel flow table.

The revalidator thread 226 periodically (e.g., every 500 ms) collects statistics from the kernel datapath by querying the kernel flow table 214 to retrieve the counter values for each provisioned flow and store the retrieved values in the flow entries in the pipelined flow tables (specifically, the monitoring table, an example of which will be described in greater detail below with respect to FIGS. 5-6). As will be described in greater detail below, the revalidator thread 226 may also refer to a subflow table (an example of which will be described in greater detail below with respect to FIGS. 5 and 7) to identify for which flows statistics could be collected. The revalidator 226 would then store the collected statistics in the corresponding entry for the subflow. In various embodiments, the revalidator 226 is also responsible for enforcing kernel flow table 214 replacement policies and removing idle flows from the datapath.

It will be apparent that additional elements may be included in the architecture 200 but omitted from the figure. For example, the user space 220 may also include a database server for storing configured parameters informing the operation of the switch. Various additional modifications will be apparent.

Figure 3:
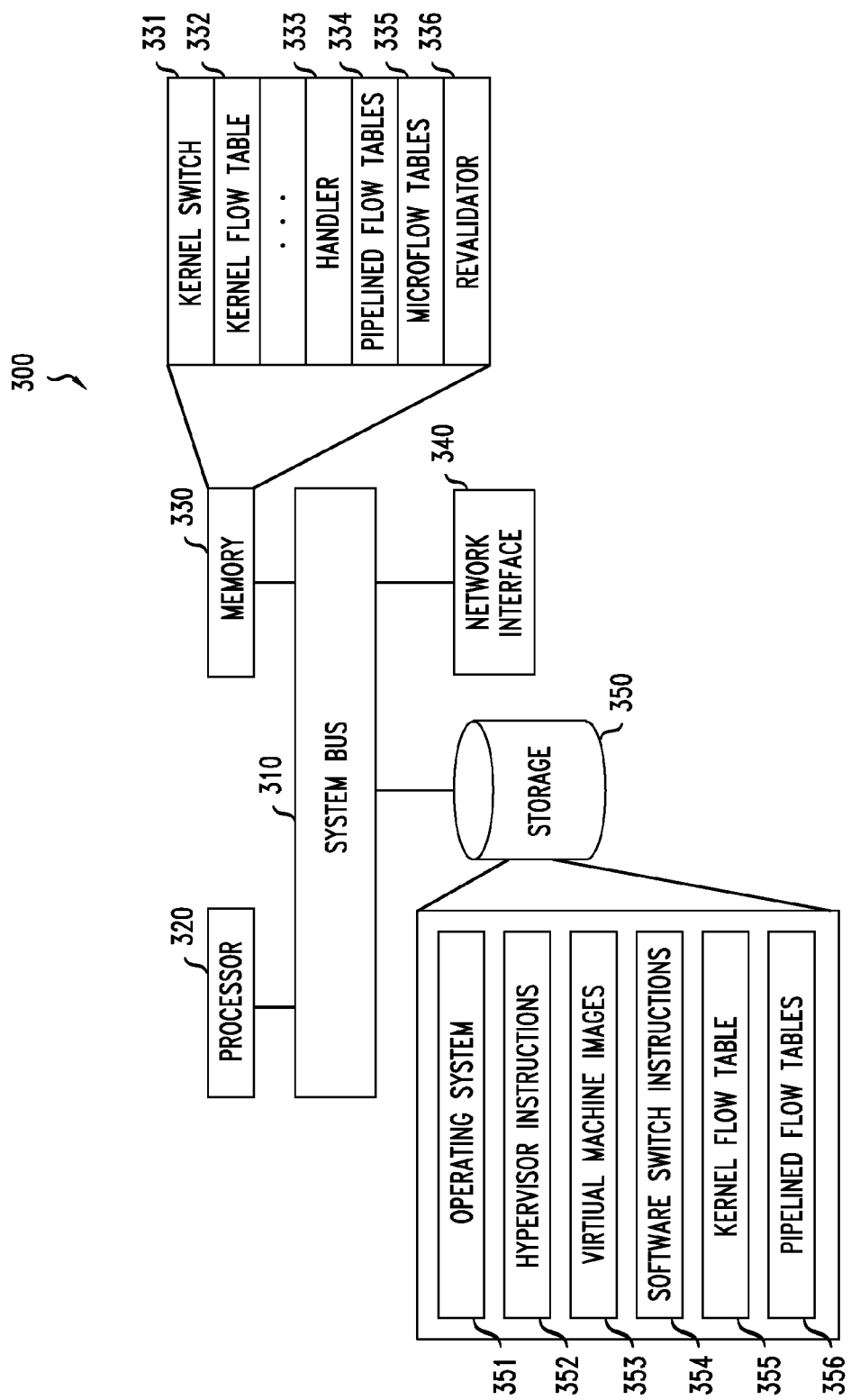
FIG. 3 illustrates an exemplary hardware device for implementing an SDN switch.

FIG. 3 illustrates an exemplary hardware device 300 for implementing an SDN switch. The hardware may correspond to the server 120 of FIG. 1. In other embodiments, such as those wherein the SDN switch is not implemented as part of a hypervisor or otherwise in a server supporting virtual machines, various modifications will be apparent such as the omission of appropriate instruction sets and other data from the storage 350.

As shown, the device 300 includes a processor 320, memory 330, network interface 340, and storage 350 interconnected via one or more system buses 310. It will be understood that FIG. 3 constitutes, in some respects, an abstraction and that the actual organization of the components of the device 300 may be more complex than illustrated.

The processor 320 may be any hardware device capable of executing instructions stored in the memory 330 or the storage 350. As such, the processor may include a microprocessor, field programmable gate array (FPGA), application-specific integrated circuit (ASIC), or other similar devices.

The memory 330 may include various memories such as, for example L1, L2, or L3 cache or system memory. As such, the memory 330 may include static random access memory (SRAM), dynamic RAM (DRAM), flash memory, read only memory (ROM), or other similar memory devices.

The network interface 340 may include one or more devices for enabling communication with other hardware devices. For example, the network interface 350 may include a network interface card (NIC) configured to communicate according to the Ethernet protocol. Additionally, the network interface 350 may implement a TCP/IP stack for communication according to the TCP/IP protocols. Various alternative or additional hardware or configurations for the network interface 340 will be apparent.

The storage 350 may include one or more machine-readable storage media such as read-only memory (ROM), random-access memory (RAM), magnetic disk storage media, optical storage media, flash-memory devices, or similar storage media. In various embodiments, the storage 350 may store instructions for execution by the processor 320 or data upon which the processor 320 may operate.

For example, as shown, the storage 350 includes an operating system 351 for coordinating the basic operations of the device and hypervisor instructions 352 for coordinating the instantiation and operation of one or more virtual machine images 353. In other embodiments, this information 352, 353 may be omitted from the storage.

The storage also includes software switch instructions 354 for defining the various threads that perform the functions of an SDN switch as described herein. For example. The software switch instructions 354 may include instruction defining the kernel switch 212, handler 224, and revalidator 226 threads described in FIG. 2. The storage 350 may also store versions of the kernel flow table 355 and pipelined flow tables 356 for use by the software switch instructions 354. In other embodiments, some or all of this information 355, 356 may only be resident in the memory 330 and may be omitted from the storage 350. As shown, the memory device currently includes threads defining the kernel switch 331, the handler 333, and the revalidator 336. To support the operations thereof, the memory 330 also stores versions of the kernel flow table 332, pipelined flow tables 334, and microflow tables 335 (which may be considered a part of the pipelined flow tables). As shown, the kernel switch 331 and kernel flow table 332 may occupy a different area of memory from the handler 333, pipelined flow tables 334, microflow tables 335, and revalidator thread 336. For example, the former may occupy kernel space while the latter may occupy user space.

It will be apparent that various information described as stored in the storage 350 may be additionally or alternatively stored in the memory 130. In this respect, the memory 330 may also be considered to constitute a "storage device" and the storage 350 may be considered a "memory." Various other arrangements will be apparent. Further, the memory 330 and storage 350 may both be considered to be "non-transitory machine-readable media." As used herein, the term "non-transitory" will be understood to exclude transitory signals but to include all forms of storage, including both volatile and non-volatile memories.

While the device 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein. Further, where the device 300 is implemented in a cloud computing system, the various hardware components may belong to separate physical systems. For example, the processor 320 may include a first processor in a first server and a second processor in a second server.

FIG. 4 illustrates an exemplary flow processing table 400. The flow processing table 400 may correspond to the kernel flow table 214 of FIG. 2, the kernel flow table 355 of FIG. 3, or the kernel flow table 332 also of FIG. 3. As explained above, the flow processing table 400 may be used to determine, for a given received packet, what actions are to be taken.

The flow processing table 400 includes multiple rules that each include multiple fields 405, 410, 415. A matching rule field 405 is used to identify whether, for a received packet, a rule is applicable. Specifically, the matching rule field 405 specifies multiple header values that, when the packet carries the header values specified, is deemed to belong to the flow to which a rule applies. For the sake of brevity, the matching rules are shown to define flows based on the values of four header fields: source IP address, source port, destination IP address, and destination port. It will be appreciated that numerous additional header fields may be taken into account and various modifications will be apparent.

Various embodiments herein allow for rules to be matched at differing granularities. For example, a first matching rule may be defined for one specific microflow wherein values are defined for all packet header fields that are considered by the implementation, while other matching rules may be defined for megaflows where one or more of these packet header fields are not considered (or are matched against a wildcard "*" value). To increase the speed at which the kernel switch can retrieve a result for a given packet, the flow processing table 400 may be implemented as a hash table. In such embodiments, the matching rule field 405 may store a value that is a hash value derived from the field values (ignoring wildcarded values using, for example, a bitmask identifying the set of header fields which are to be considered by the hash function). For the sake of readability, the matching rule field 405 is shown as including human-readable values.

An actions field 410 stores in indication of one or more actions that are to be performed when a rule is identified as applicable to a packet. The actions may include processing actions such as forwarding, modifying, or dropping a packet or monitoring actions such as counting packets of a defined packet type. A counters field 415 is used to store monitoring statistics for later retrieval by the revalidator thread. In various embodiments, the counters field 415 may store a data structure that is defined to generically hold any type of counter appropriate for the flow. For example, the data structure may enable counters to be defined in a type-value pair format.

As an example, a first rule 420 indicates that, for any flow between source IP A and destination IP-port pair C:K (without regard for the source port), packets will have the source IP changed to B and then be forwarded out on port 1 (which may correspond to a physical port or a virtual port and be delivered to the device or process connected to that port). The counters indicate that, for this megaflow, 100 packets and 125 kilobyte of throughput have been monitored.

As another example, the next rule 430 indicates that any packet belonging to a flow originating at source IP D and destined for the IP and port combination of E:J, the packet will be output on port 2 as a processing action and the kernel thread will monitor SYN packets as a monitoring action. As can be seen, in the counter field in addition to the overall packet and byte counters, a SYN packet counter is provided.

After identifying the rule 430 as applicable to a received packet, the kernel switch will determine whether the packet is a SYN packet and, if so, increment the SYN packet counter, which is currently 23.

As a final example, the rule 440 includes a matching rule that identifies a specific microflow from source D:F to destination E:G. For packets belonging to this microflow, the kernel switch will output the packet to port 2 and monitor SYN packets. It will be apparent that the action set for the last two rules 430, 440 is identical and similar functionality in terms of packet processing could be achieved by combining these rules into a single rule applicable to the megaflow from source D to destination E. However, as can be seen in the counters fields, there is now additional visibility into the subflow of rule 430 and the microflow of rule 440 where, if a single rule were employed, the revalidator would be unable to tell from the single reported packet, byte, and SYN counters what portion of the monitored traffic belonged to these sub- and microflows.

FIG. 5 illustrates an exemplary flow table pipeline 500. As explained above, the pipeline 500 may be used by a switch daemon when generating a new rule for inclusion in a flow processing table, such as that described with reference to FIG. 4.

As shown, the pipelined table first presents a plurality 510 of flow rule generation tables 512, 514, 516. These tables are used to determine, for a particular packet, what processing action should be taken. For example, considering a packet from A to C and beginning with table 0, the handler thread may identify an entry that indicates packets having a destination address of "C" should be output on port 1 and that processing should continue on table 516. Temporarily storing the matched packet fields <DestIP> and set of processing actions <output port=1>, the handler thread evaluated table 516 and locates an entry that indicates for packets originating from source A, the source address should be reset to B. If table 516 does not point to an additional table of the flow rule generation tables 510, the handler would proceed, with the current matched packet fields <SrcIP, DestIP> and set of processing actions <set SrcIP=B, output port=1>, to evaluate the monitoring table 520. Assuming for the purposes of the present example that no entries of the monitoring table are applicable, proceed to "execute the action set" 525 by generating a new rule using the matched packet fields and processing actions identified while traversing the flow rule generation tables 510. The rule would then be installed in the flow processing table and the kernel switch module would process the packet appropriately.

The monitoring table 520 may be evaluated after the flow rule generation tables 510 to determine if any further modifications to the rule to be generated are appropriate. Specifically, the monitoring table 520 may affect the rule in at least two different ways. First, the monitoring table may add one or more actions to the action set indicating specific types of monitoring that are to be performed. For example, these actions may request that the kernel switch maintain a count of packets belonging to a flow that match a specific type (e.g., SYN packets, ACK packets, etc.). Various additional extended monitoring functions will be apparent. Given any desired monitoring function to be performed on a per-flow basis, the concepts herein may be adapted to provide such monitoring by configuring the kernel to perform the monitoring in response to an action keyword and then including the action keyword in the monitoring table for desired flows.

The monitoring table 520 may also affect the rule to be generated by adding fields to the matched fields set that will then be used to generate the matching rule. According to various embodiments, this may be accomplished by changing a bitmask and reducing the number of wildcarded fields. For example, to ensure proper flow granularity in the flow processing table, any fields that are used to determine applicability of an entry of the monitoring table 520 to a packet will be added to the list of fields used to generate the matching rule for a new processing rule (even where the entries do not actually match the received packet). Additionally, some monitoring table entries may indicate that monitoring should be performed on a subflow basis and may indicate one or more additional fields that should also be incorporated into the matching rule to provide even greater granularity with respect to the statistics that are reported. In such cases, one entry in the monitoring table may thus correspond to multiple subflows that are to be monitored; as such, instead of storing counters in the entry itself, the entry points to a subflow table 530 that will store the monitored statistics for each monitored subflow corresponding to that entry. The switch may then use the collected statistics in various manners such as, for example, performing anomaly detection 535 to locate malicious behavior.

FIG. 6 illustrates an exemplary monitoring table 600. The monitoring table 600 may correspond to the monitoring table 520 of FIG. 5. As shown, the monitoring table 600 is similar, in some respects, to the flow processing table 400 describe with respect to FIG. 4.

As shown, the monitoring table 600 includes a matching rule field 605 for storing packet header values that are used to determine applicability of a table entry to a received packet, an actions field 610 for defining monitoring actions to be taken with respect to a packet to which the entry applies, and a counters field 615 for storing statistics collected by the revalidator when an entry is not being monitored on a per-subflow basis. For flows that are monitored on a per-subflow basis, a pointer field 620 stores a pointer to a subflow table that will store counters for each such subflow. An example of a subflow table will be described in greater detail with respect to FIG. 7.

As a first example, a first entry 630 indicates that for all flows originating from source IP D, the SYN packets should be monitored and that 20 such packets have been seen prior to the last execution of the revalidator thread with respect to this entry. If the monitoring table 600 is taken to have been used in generation of the flow processing table 400, it may be determined that this entry was used during the generation of rules 430, 440 because both rules require monitoring of SYN packets originating from IP D.

A second example entry 640 shows that microflow monitoring should be performed for any flow destined for port G of any device or process. In other words, a separate set of appropriate counters should be stored for each specific microflow destined for port G. As such, any rule provisioned for a flow destined for port G will include a matching rule that takes into account all packet header fields (i.e., no wildcards) such that these counters will be established and maintained on a per-microflow basis. The entry 640 indicates that a subflow table at memory address 0x4521 will be used to store the counters for each such microflow.

Similarly, the last example entry indicates that for any flow destined for port H, subflow monitoring will be performed. While similar to the microflow monitoring described above, subflow monitoring allows for the use of some wildcards such that microflows may be aggregated into subflows that are each associated with a single counter set. As can be seen, the subflow monitoring action includes a bitmask {1010} which indicates which fields may not be wildcarded and, instead must be included in the generated rule to provide the desired monitoring granularity. The specific bitmap shown, {1010} may indicate that the source and destination IP fields should be included in the matching rule for the new processing rule but that the source and destination ports may be wildcarded (unless these fields are included by operation of another monitoring table entry, the monitoring table matching rules, or the flow rule generation tables). In this regard, the microflow monitoring action is a specific case of the subflow monitoring action where the bitmask is set to all 1's. The example entry 650 also indicates that the subflow counters will be stored in a table located at memory address 0x45A0.

FIG. 7 illustrates a set of exemplary subflow tables 700. The set of subflow tables 700 may correspond to the subflow tables 530 of FIG. 5. This exemplary set 700 is shown to include three subflow tables 710, 720, 730, though this number may vary with how many flows are to be monitored on a per-subflow basis. Each subflow table 710, 720, 730 stores a list of flows (identified by a set of packet header information with wildcards where applicable) and associated counters.

An example, a first subflow table 710 is shown to reside at memory address 0x4521. As such, this subflow table 710 may be pointed to by the example monitoring table entry 640. The subflow table 710 includes multiple entries 712, 714, 716 that each identify a different and previously-seen microflow implicated by that monitoring table entry. As can be seen, the subflow entry stores separate counters for each known flow destined for port G.

Figure 8:
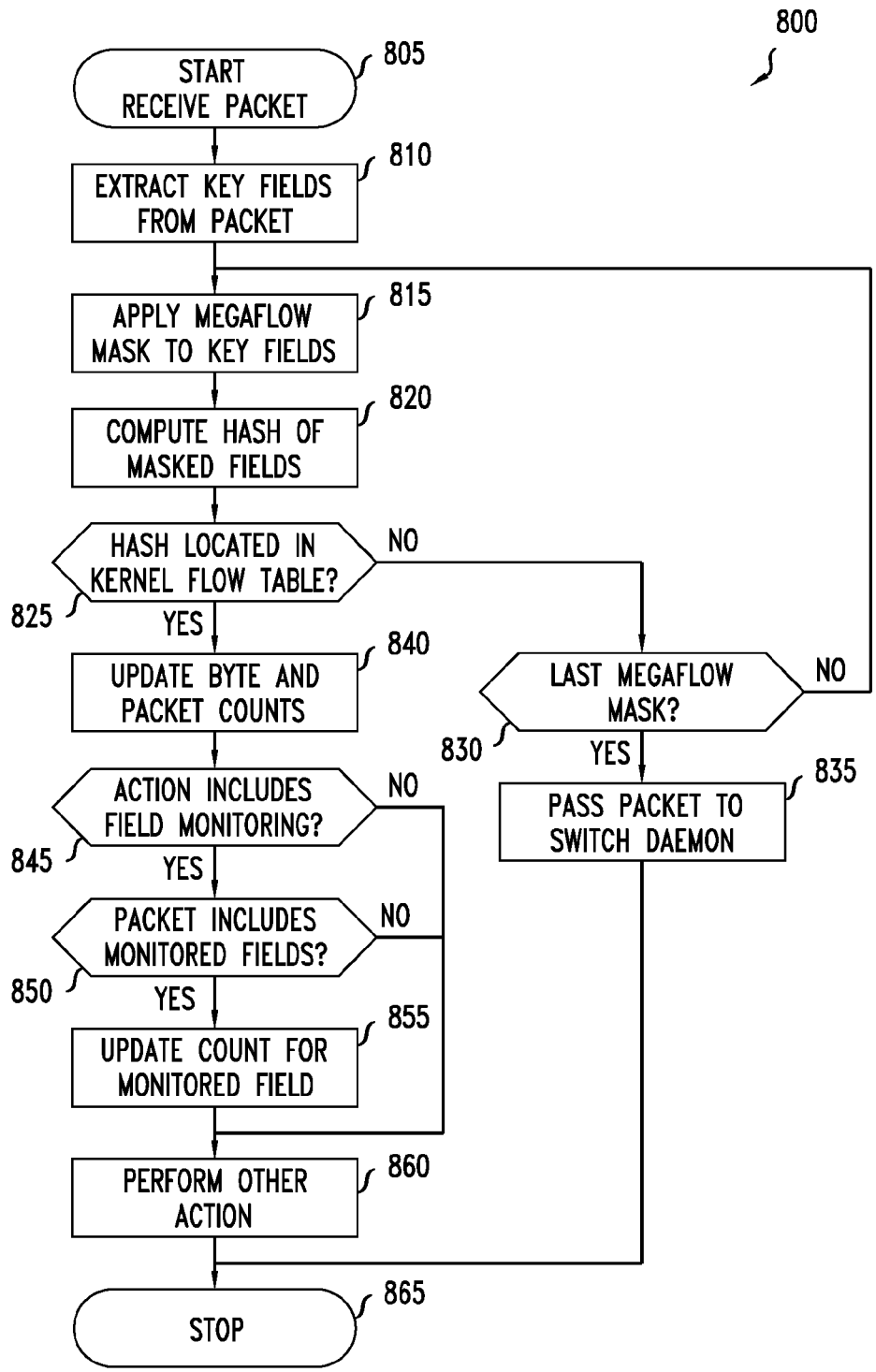
FIG. 8 illustrates an exemplary method for processing incoming packets.

FIG. 8 illustrates an exemplary method 800 for processing incoming packets. This method 800 may be performed by the processor 320 of FIG. 3 and may correspond to the kernel switch 212 or kernel switch thread 331.

The method 800 begins in step 805 in response to the switch receiving a packet. Then, in step 810, the switch extracts all key fields from the packet. Various embodiments may utilize different sets of key fields. For example, the embodiments described herein utilize a total of four key fields, which would all be extracted at this point. Various embodiments may utilize additional key fields. In some embodiments, over 40 key fields are used to uniquely identify each microflow.

As explained above, processing rules may not always be defined to match against only microflows. Instead, matching rules may be provided with wildcards. To facilitate matching against different matching rules where different combinations of keyfields may be used, the method 800 attempts to match every combination of keyfields against the flow processing table. To this end, the switch uses a plurality of megaflow masks that include a bit for each key field set to 1 if the key field is to be taken into account. This set may include all possible bitmasks (yielding $2^n$ bitmasks for n key fields) or may include only those bitmasks for which there is at least one rule in the flow processing table.

The switch applies a first megaflow bitmask to the key fields in step 815 to zero out any values that are wildcarded by the current bitmask and then uses the resulting values to compute a hash value. Virtually any hash function may be used as long as it is the same has function that was originally used to generate the rule's matching rule. In some embodiments, different hash functions may be selected depending on the bitmask currently applied to the key fields.

In step 825, the switch determines whether the hash computed in step 820 is located in any of the rules stored by the flow processing table (thereby indicating that the rule matches the flow to which the packet belongs). If not, the method 800 proceeds to step 830 where the switch determines whether the last megaflow mask has been considered. If not, the method will loop back to step 815 where the switch will take the next bitmask into consideration. If, on the other hand, the switch has processed all bitmasks without locating an applicable rule in the flow processing table, the switch may determine that the flow processing table should be updated and pass the packet up to the switch daemon in step 835 and the method proceeds to end in step 865. Upon receiving such an update and receiving the packet back from the switch daemon, the switch may proceed to execute the method 800 again.

When the switch has located a computed hash in the flow processing table, the method proceeds from step 840 where the switch updates the byte and packet counters for the matched rule based on the size of the received packet. Next, in step 845, the switch determines whether the matched rule's action list indicates any field monitoring is to be performed. For example, the action list may include a SYN monitoring or ACK monitoring action. If so, the switch determines in step 850 whether the current packet is of the type indicated by the field monitoring instruction. For example, the switch may analyze the packet to determine if it is a SYN or ACK packet, as appropriate. Various other modifications to implement other types of monitoring based on rule actions will be apparent. If the packet is of the monitored type, the switch updates the counter for that monitored packet type in step 855. If, on the other hand, the rule does not include a field monitoring action or if the packet is not of a monitored type, the method 800 skips past step 855 to step 860 where the switch performs any other actions indicated by the rule (e.g., drop, forward, modify, etc.). The method then proceeds to end in step 865.

Figure 9:
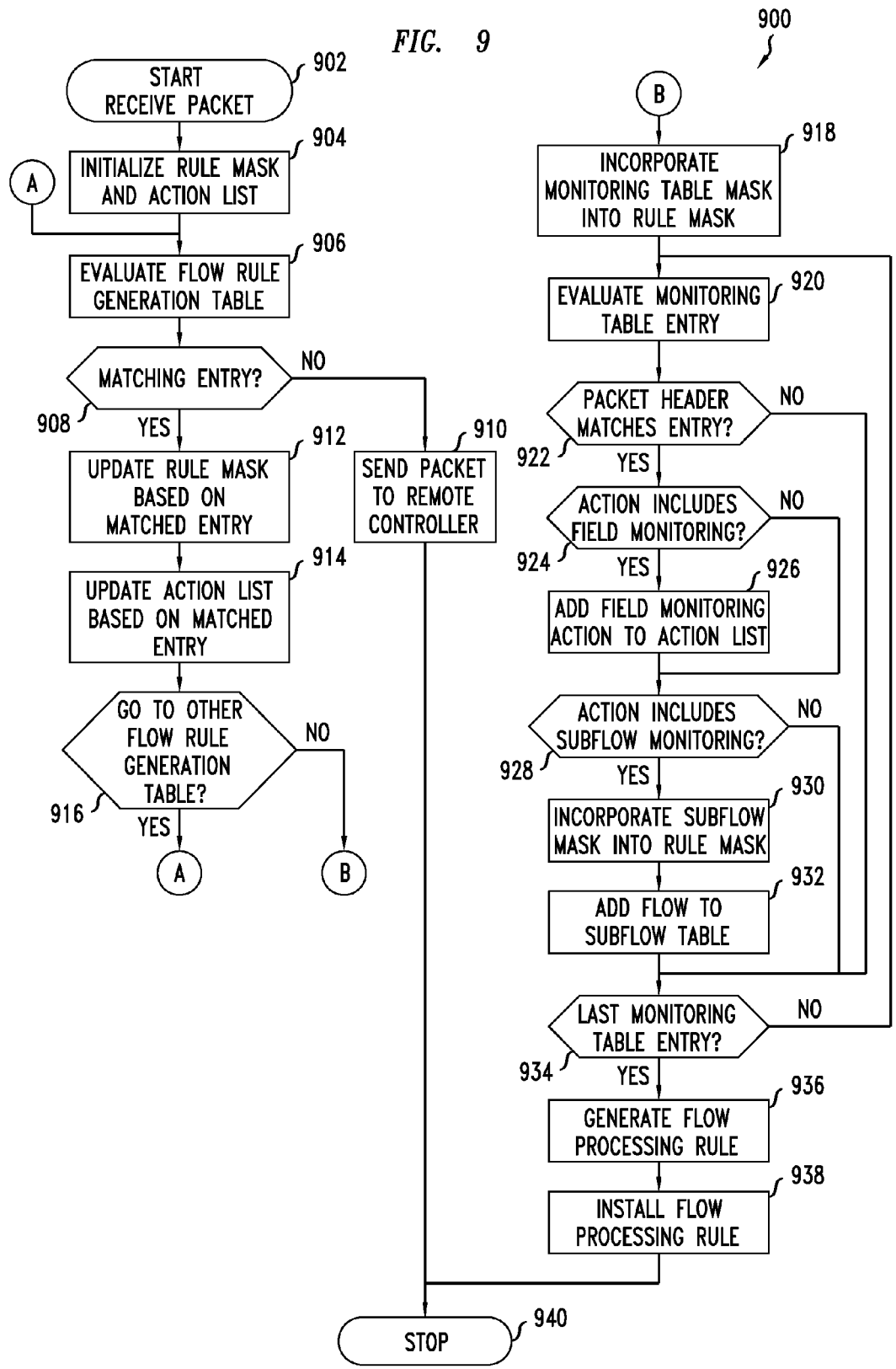
FIG. 9 illustrates an exemplary method for updating a flow processing table.

FIG. 9 illustrates an exemplary method 900 for updating a flow processing table. This method 900 may be performed by the processor 320 of FIG. 2 and may correspond to the handler thread 224 or handler thread 333.

The method begins in step 902 where the handler receives a packet such as, for example, a packet passed to the handler by the switch in step 835 of method 800. The handler then initializes the rule mask to all 0's and action list to an empty set in step 904. The handler then, in step 906, evaluates the first flow rule generation table in the pipeline to locate an entry that matches the current packet. If no such entry is found, the handler proceeds from step 908 to step 910 to determine that an update should be performed for the pipelined tables before a flow processing rule can be generated and sends the packet to a remote SDN controller (thereby requesting that new policy configurations be provisioned into the pipelined flow tables).

If, on the other hand, the packet does match an entry in the current flow rule generation table, the handler updates the rule mask based on the matched entry in step 912. For example, if the entry is matched based on a destination IP and port, the handler sets the bits corresponding to these fields in the bitmask to 1. The handler also adds any actions specified by the matched entry to the action list in step 914. In step 916, the handler determines whether the matched entry indicates that another flow rule generation table should be evaluated before moving on (e.g., a "Go To Table N" instruction). If so, the method loops back to step 906 to evaluate the next table. Otherwise, the method proceeds to begin evaluation of the monitoring table in step 918.

In various embodiments, the entries of the monitoring table are not mutually exclusive and, as such, multiple monitoring table entries may be taken into account when generating a rule. To ensure proper granularity, a "monitoring table mask" is incorporated into the rule mask in step 918. This monitoring table mask includes a bit set for each field that is considered by any entry of the monitoring table. For example, referring back to the example monitoring table 600, the monitoring table bitmask would be {1001} because the only fields taken into account in matching an entry to a packet are the source IP and destination port.

In step 920, the handler evaluates a monitoring table entry by comparing the matching rule to the current packet. If the packet does not match, the method skips from step 922 ahead to step 934. Otherwise, the handler determines, in step 924, whether the action of the matched monitoring table entry includes any field monitoring actions (e.g., "SYN packet monitoring," "ACK packet monitoring," etc.). If so, the handler adds the field monitoring action(s) to the action list in step 926. This step may also include, in some embodiments, modifying a counter field to include a location to store the monitored statistics associated with the field monitoring action.

In step 928, the handler determines whether the action includes a subflow monitoring action. If so, the handler incorporates the subflow mask associated with the action into the working rule mask in step 930. For example, if the subflow monitoring action is a microflow monitoring action, a mask of all 1's will be incorporated into the rule mask. Then, in step 932, the handler will add the flow to the subflow table identified by the monitoring table entry. For example, using the bitmask associated with the subflow monitoring instruction, the handler may extract the associated header fields and store them together in the subflow table as a subflow identifier along with newly-initialized counters.

After processing a monitoring flow entry, the handler determines in step 934 whether there are no more monitoring table entries to consider. If additional monitoring table entries remain, the method 900 loops back to step 920 to consider additional entries. Otherwise, the handler generates a new flow processing rule in step 936 based on the final rule mask and action list. For example, the handler may compute a hash function using the packet header fields identified by the mask in a manner similar to that of steps 810 and 820 of method 800. Having created the matching rule, the handler may store the matching rule together with the action list and appropriate initialized counters. The handler then installs the flow processing rule into the flow processing table in step 938. The method then proceeds to end in step 940.

Various additional modifications in view of the foregoing will be apparent. For example, when the monitoring table is modified, the revalidator may be configured to examine each installed flow processing rule to determine if any rules should be replaced. To effect this functionality, the revalidator may update the monitoring table mask based on the new entries and, if it has changed, determine whether any flow processing rules are associated with a mask that is not "finer" than the new monitoring table mask (i.e., includes at least one 0 where the new monitoring table mask includes a 1). If there are any such rules, the revalidator may trigger deletion of that rule such that, upon receiving the next packet belonging to that flow, the handler will generate a new rule based on the updated monitoring table.

The revalidator may also be modified to collect data in a monitoring-table driven approach. For example, the revalidator may traverse the monitoring table and subflow table entries and update the counters there as appropriate based on the statistics retrieved from the flow processing table. For example, to update the counters for the example monitoring table entry 630, the revalidator may retrieve the counters for the example packet processing rules 430, 440 and sum these values for inclusion in the monitoring table entry.

According to the foregoing, various embodiments described herein provide for enhanced traffic monitoring in SDN switches. For example, by decoupling packet processing requirement from monitoring requirements, rules can be provisioned at a sufficient granularity as to monitor any microflow or aggregate thereof deemed to be of interest, even if the processing requirements would not otherwise provide the appropriate level of granularity. Various additional benefits will be apparent in view of the foregoing.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable storage medium encoded with instructions for execution by a network device, the non-transitory machine-readable storage medium comprising:
   instructions for processing packets based on a flow processing table, wherein:
      the flow processing table comprises a plurality of rules, and
      a rule of the plurality of rules comprises a matching rule that identifies one or more flows to which the rule applies and at least one action that identifies at least one action to be taken when the rule applies; and
   instructions for generating a new rule to be added to the flow processing table when the instructions for processing packets fails to identify a rule of the plurality of rules as applicable to a received packet, comprising:
      instructions for evaluating at least one flow rule generation table to identify a first set of packet header fields and a set of processing actions;

instructions for evaluating a monitoring table to identify at least one of a second set of packet header fields and a set of monitoring actions, wherein the monitoring table comprises a plurality of entries identifying monitoring actions to be taken for various groups of flows;

instructions for generating a new rule based on the first set of packet header fields, the set of processing actions, and at least one of the second set of packet header fields and the set of monitoring actions; and instructions for installing the new rule in the flow processing table.

2. The non-transitory machine-readable storage medium of claim 1, wherein the instructions for evaluating a monitoring table to identify at least one of a second set of packet header fields and a set of monitoring actions comprise:

instructions for retrieving the second set of packet header fields from an entry identified as applicable to the received packet, wherein the second set of packet header fields is different from a set of packet header fields used to identify the entry as applicable.

3. The non-transitory machine-readable storage medium of claim 2, wherein the instructions for retrieving the second set of packet header fields from an entry identified as applicable to the received packet comprise:

instructions for storing an identification of the flow to which the received packet belongs in a subflow table identified by the applicable entry.

4. The non-transitory machine-readable storage medium of claim 3, further comprising:

instructions for periodically retrieving monitored statistics for a plurality of flows from the flow processing table, comprising:

instructions for identifying a plurality of subflows using the subflow table; and instructions for retrieving monitored statistics for the plurality of subflows.

5. The non-transitory machine-readable storage medium of claim 1, wherein the instructions for evaluating a monitoring table to identify at least one of a second set of packet header fields and a set of monitoring actions comprise:

instructions for, based on an entry identified as applicable to the received packet, including in the set of monitoring actions a field monitoring action indicating that monitoring will be performed with respect to packets of an identified type, wherein the new rule includes a data structure for storing a counter for packets of the identified type.

6. The non-transitory machine-readable storage medium of claim 1, wherein the instructions for evaluating a monitoring table comprise:

instructions for identifying multiple entries from the monitoring table as applicable to the received packet;

instructions for compiling the set of monitoring actions from the multiple applicable entries; and instructions for identifying the second set of packet header fields as a set of all fields considered by any entry in the monitoring table.

7. The non-transitory machine-readable storage medium of claim 1, wherein the first set of packet header fields and the second set of packet header fields are first and second bitmasks, respectively, and the instructions for generating a new rule comprise:

instructions for combining the first and second bitmasks to create a combined bitmask; and instructions for computing a hash value from a plurality of packet header field values identified by the combined bitmask, wherein the hash value is used as a matching rule of the new rule.

8. A network device comprising:
a network interface;
a memory storing:
a flow processing table comprising a plurality of rules, wherein a rule of the plurality of rules comprises a matching rule that identifies one or more flows to which the rule applies and at least one action that identifies at least one action to be taken when the rule applies,
at least one flow rule generation table, and
a monitoring table comprising a plurality of entries identifying monitoring actions to be taken for various groups of flows; and
a processor in communication with the memory and the network interface, the processor being configured to:
process packets received via the network interface based on the flow processing table,
generate a new rule to be added to the flow processing table when, in processing packets, the processor fails to identify a rule of the plurality of rules as applicable to a received packet, comprising:
evaluate the least one flow rule generation table to identify a first set of packet header fields and a set of processing actions;
evaluate the monitoring table to identify at least one of a second set of packet header fields and a set of monitoring actions, wherein the monitoring table comprises a plurality of entries identifying monitoring actions to be taken for various groups of flows;
generate a new rule based on the first set of packet header fields, the set of processing actions, and at least one of the second set of packet header fields and the set of monitoring actions; and
install the new rule in the flow processing table.

9. The device of claim 8, wherein in evaluating a monitoring table to identify at least one of a second set of packet header fields and a set of monitoring actions the processor is configured to:

retrieve the second set of packet header fields from an entry identified as applicable to the received packet, wherein the second set of packet header fields is different from a set of packet header fields used to identify the entry as applicable.

10. The device of claim 9, wherein in retrieving the second set of packet header fields from an entry identified as applicable to the received packet the processor is configured to:

store an identification of the flow to which the received packet belongs in a subflow table identified by the applicable entry.

11. The device of claim 10, wherein the processor is further configured to:

periodically retrieve monitored statistics for a plurality of flows from the flow processing table, comprising:

identifying a plurality of subflows using the subflow table; and retrieving monitored statistics for the plurality of subflows.

12. The device of claim 8, wherein in evaluating a monitoring table to identify at least one of a second set of packet header fields and a set of monitoring actions the processor is configured to:

based on an entry identified as applicable to the received packet, include in the set of monitoring actions a field monitoring action indicating that monitoring will be performed with respect to packets of an identified type, wherein the new rule includes a data structure for storing a counter for packets of the identified type.

13. The device of claim 8, wherein in evaluating a monitoring table the processor is configured to:
identify multiple entries from the monitoring table as applicable to the received packet;
compile the set of monitoring actions from the multiple applicable entries; and
identify the second set of packet header fields as a set of all fields considered by any entry in the monitoring table.

14. The device of claim 8, wherein the first set of packet header fields and the second set of packet header fields are first and second bitmasks, respectively, and in generating a new rule the processor is configured to:
combine the first and second bitmasks to create a combined bitmask; and
compute a hash value from a plurality of packet header field values identified by the combined bitmask, wherein the hash value is used as a matching rule of the new rule.

15. A method performed by a network device, the method comprising:
receiving a packet belonging to a flow;
evaluating a flow processing table comprising a plurality of rules to determine whether a rule of the plurality of rules is applicable to the received packet, wherein:
a rule of the plurality of rules comprises a matching rule that identifies one or more flows to which the rule applies and at least one action that identifies at least one action to be taken when the rule applies;
generating a new rule to be added to the flow processing table when the after failing to identify a rule of the plurality of rules as applicable to the received packet, comprising:
evaluating at least one flow rule generation table to identify a first set of packet header fields and a set of processing actions;
evaluating a monitoring table to identify at least one of a second set of packet header fields and a set of monitoring actions, wherein the monitoring table comprises a plurality of entries identifying monitoring actions to be taken for various groups of flows;
generating a new rule based on the first set of packet header fields, the set of processing actions, and at least one of the second set of packet header fields and the set of monitoring actions; and
installing the new rule in the flow processing table.

16. The method of claim 15, wherein the step of evaluating a monitoring table to identify at least one of a second set of packet header fields and a set of monitoring actions comprises:
retrieving the second set of packet header fields from an entry identified as applicable to the received packet, wherein the second set of packet header fields is different from a set of packet header fields used to identify the entry as applicable.

17. The method of claim 16, wherein the step of retrieving the second set of packet header fields from an entry identified as applicable to the received packet comprises:
storing an identification of the flow to which the received packet belongs in a subflow table identified by the applicable entry.

18. The method of claim 17, further comprising:
periodically retrieving monitored statistics for a plurality of flows from the flow processing table, comprising:
identifying a plurality of subflows using the subflow table; and
retrieving monitored statistics for the plurality of subflows.

19. The method of claim 15, wherein the step of evaluating a monitoring table to identify at least one of a second set of packet header fields and a set of monitoring actions comprises:
based on an entry identified as applicable to the received packet, including in the set of monitoring actions a field monitoring action indicating that monitoring will be performed with respect to packets of an identified type, wherein the new rule includes a data structure for storing a counter for packets of the identified type.

20. The method of claim 15, wherein the step evaluating a monitoring table comprises:
identifying multiple entries from the monitoring table as applicable to the received packet;
compiling the set of monitoring actions from the multiple applicable entries; and
identifying the second set of packet header fields as a set of all fields considered by any entry in the monitoring table.

* * * * *